(12) United States Patent
Hagiwara et al.

(10) Patent No.: US 6,557,234 B1
(45) Date of Patent: May 6, 2003

(54) MEDIUM FIXING METHOD AND MEDIUM SUPPORT APPARATUS

(75) Inventors: Hiroyuki Hagiwara, Utsunomiya (JP); Hiroshi Watanabe, Utsunomiya (JP); Shojiro Yamazaki, Chichibu (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 09/668,376

(22) Filed: Sep. 25, 2000

(30) Foreign Application Priority Data

Sep. 27, 1999 (JP) ............................................. 11-271990

(51) Int. Cl.[7] ................................................ B23P 19/04
(52) U.S. Cl. ............................. 29/433; 29/464; 29/241; 29/759; 414/788.9
(58) Field of Search ...................... 29/433, 464, 241, 29/759; 414/788.9, 789.1; 406/192

(56) References Cited

U.S. PATENT DOCUMENTS

| | | | | |
|---|---|---|---|---|
| 2,810,243 A | * | 10/1957 | Mellowes | ..................... 29/433 |
| 4,231,147 A | * | 11/1980 | Witt | ............................ 29/433 |
| 4,506,442 A | * | 3/1985 | Alzmann et al. | ............. 29/464 |
| 4,910,856 A | * | 3/1990 | Watanabe | ..................... 29/241 |
| 5,077,888 A | * | 1/1992 | Tokisue et al. | ............... 29/467 |
| 5,678,310 A | * | 10/1997 | Chiba | .......................... 29/464 |
| 5,930,066 A | | 7/1999 | Ishizuka et al. | ......... 360/77.03 |
| 6,321,442 B1 | * | 11/2001 | Berberich et al. | ............ 29/759 |

* cited by examiner

Primary Examiner—David P. Bryant
(74) Attorney, Agent, or Firm—Fitzpatrick, Cella, Harper & Scinto

(57) ABSTRACT

In a medium fixing method of fixing one or a plurality of mediums on a shaft while the one or plurality of mediums each having a circular opening portion in a substantially center are stacked and the shaft is inserted into the opening portions, the mediums are fixed to the shaft while the mediums into which the shaft is inserted are guided with a fluid.

4 Claims, 5 Drawing Sheets

MEDIUM FIXING METHOD AND MEDIUM SUPPORT APPARATUS

BACKGROUND OF THE INVENTION

1. Field of the Invention

The present invention relates to a medium fixing method and medium support apparatus and, more particularly, to a medium fixing method and medium support apparatus suitable for an apparatus, for positioning/fixing an information recording/reproducing medium such as a hard disk, optical disk, or optical card or a medium such as a semiconductor wafer to a shaft and rotating the medium at a high speed while reducing the axis deflection amount.

2. Related Background Art

FIG. 7 is a sectional view of the main part of a conventional medium support apparatus. In the medium support apparatus shown in FIG. 7, when a plurality of magnetic disks as mediums 101 are to be stacked on a shaft 103, ring-like spacers 102 are inserted between the mediums 101, and the mediums 101 are fixed with a clamper 104 to keep them parallel. This arrangement mainly aims at suppressing axis deflection of the mediums 101 when the shaft 103 rotates. In addition, the mediums 101 are alternately pressed against the shaft 103 to be fixed while the gaps between holes 101a of the respective mediums and the shaft 103 are distributed to an arbitrary virtual axis, thereby suppressing dynamic weight balance disturbance caused by slight gaps between inner circumferential surfaces 101b of the mediums 101 and the shaft 103.

Recently, information recording apparatus have been required to record large volumes of information, and there are increasing tendencies to increase the recording density and rotational speed of recording mediums in the apparatuses. In order to attain high recording density and high rotational speed, a reduction in track pitch and strict track pitch error control are required. To meet these requirements, any eccentricity between each medium 101 and a driving shaft 7 must be suppressed as well as synchronous and asynchronous vibrations of the driving shaft 7. As compared with the required track pitch precision, the standard diameter tolerance of the hole 101a in the central portion of the medium 101 is very large. The eccentricity caused between the driving shaft 7 or shaft 103 and the medium 101 makes it difficult to improve the track pitch precision.

In addition, in rotating the medium 101, the dynamic weight balance disturbance in the medium support apparatus including the mediums 101 produces vibrations. At a high rotational speed, this disturbance vibrates not only the driving shaft 7 but also the magnetic recording converter such as a magnetic head through the base on which the motor (not shown) is fixed, interfering with high-precision positioning of these components. Furthermore, stacking many mediums 101 makes it difficult to correct the eccentricity between each medium and the shaft 103, and increases the dynamic weight balance disturbance in the medium support apparatus.

As described above, the conventional medium support apparatus mainly aims at suppressing surface deflection of the mediums 101 in the horizontal direction. However, no function of correcting the eccentricity of each medium and the dynamic weight balance of the medium support apparatus is added to the apparatus. For this reason, the mediums 101 are alternately pressed against the shaft 103, and the gaps between the inner circumferential surfaces 101b of the respective mediums 101 and the shaft 103 are distributed to an arbitrary virtual axis, thus suppressing the dynamic weight balance disturbance. This, however, maximizes the gaps between the respective mediums 101 and the shaft 103, and the eccentricity value becomes ½ times the tolerance size of the hole 101a in the central portion of each medium. Under these circumstances, demands have arisen for a medium support apparatus capable of positioning/fixing mediums while keeping dynamic weight balance by correcting the eccentricity of each medium.

SUMMARY OF THE INVENTION

It is an object of the present invention to provide a medium fixing method and medium support apparatus, which can reduce the axis deflection amounts of mediums such as magnetic disks with respect to a driving shaft when one or a plurality of mediums are positioned/fixed on a shaft, and can accurately rotate/drive the mediums at high speed.

According to one aspect of the present invention, there is provided a medium fixing method of fixing one or a plurality of mediums on a shaft while the one or a plurality of mediums each having a circular opening portion in a substantially center are stacked and the shaft is inserted into the opening portions, comprising fixing the mediums to the shaft while guiding the mediums into which the shaft is inserted with a fluid.

According to further aspect of the present invention, there is provided a medium fixing method of fixing one or a plurality of mediums on a shaft while the one or the plurality of mediums each having a circular opening portion in a substantially center are stacked and the shaft is inserted into the opening portions, comprising fixing the mediums to the shaft while performing position adjustment between the shaft and the mediums by forming a fluid film between a side surface portion of the shaft and inner circumferential surfaces of the opening portions of the mediums.

According to further aspect of the present invention, there is provided a medium fixing method of fixing one or a plurality of mediums on a shaft while the one or plurality of mediums each having a circular opening portion in a substantially center are stacked and the shaft is inserted into the opening portions, comprising fixing the mediums to the shaft while performing position adjustment between the mediums and the shaft by preparing a guide around the mediums and forming a fluid film between an inner surface portion of the guide and outer circumferential surfaces of the mediums.

According to further aspect of the present invention, the foregoing method further comprises inserting the shaft into the opening portions while the mediums are stacked with spacers being inserted therebetween.

According to further aspect of the present invention, there is provided a medium support apparatus comprising a function of stacking one or a plurality of mediums each having a circular opening portion in a substantially center, inserting a shaft into the opening portions of the mediums, inserting a porous material between a side surface portion of the shaft and inner circumferential surfaces of the opening portions of the mediums, and adjusting gaps between the inner circumferential surfaces of the opening portions of the mediums and the shaft by forming a fluid film between a side surface portion of the shaft and the inner circumferential surfaces of the opening portions of the mediums, thereby positioning the mediums.

According to further aspect of the present invention, there is provided a medium support apparatus comprising a function of stacking one or a plurality of mediums each having a circular opening portion in a substantially center, inserting a shaft into the opening portions of the mediums, fixing the mediums to the shaft, disposing a guide having a cylindrical porous material having an opening with a diameter substantially equal to an outer diameter of the mediums, and adjusting gaps between outer circumferential surfaces of the mediums and an inner surface of the guide by forming a fluid film between the inner surface of the guide and the outer circumferential surfaces of the mediums, thereby positioning the mediums.

According to further aspect of the invention, in the foregoing apparatus, the plurality of mediums are stacked with ring-like spacers being inserted between the respective mediums.

According to further aspect of the present invention, the foregoing apparatus further comprises fixing means for fixing the mediums to the shaft.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

A medium support apparatus according to the first embodiment of the present invention will be described below with reference to FIGS. 1 to 3.

Figure 1:
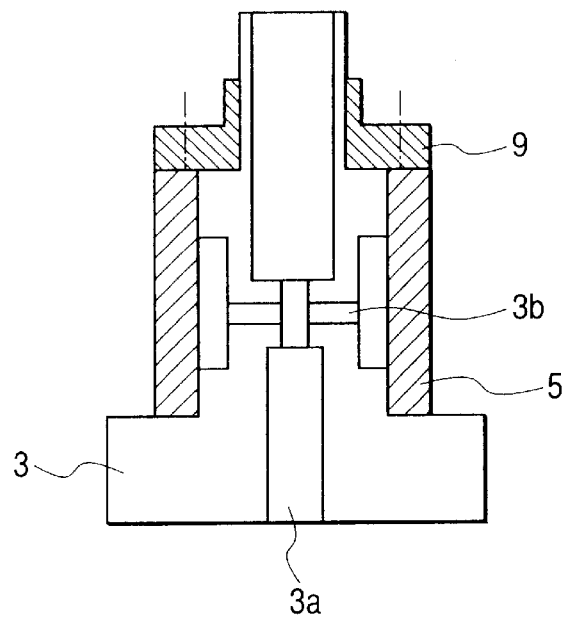
FIG. 1 is a sectional view showing the main part of a portion of a medium support apparatus according to the first embodiment of the present invention.
Figure 2:
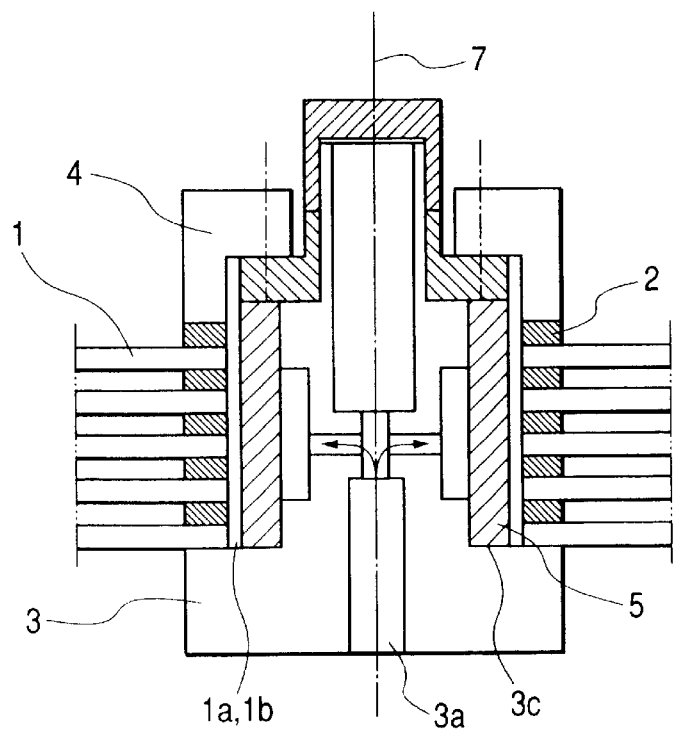
FIG. 2 is a sectional view showing the main part of a portion of the medium support apparatus according to the first embodiment of the present invention.

FIG. 1 shows the state of the apparatus before mediums (magnetic disks) are stacked on a shaft 3. FIG. 2 is a schematic view showing a state wherein a plurality of magnetic disks as mediums 1 are stacked on the shaft 3 in the apparatus shown in FIG. 1. FIG. 3 is a schematic view showing a state wherein a spindle motor 6 is fixed to the shaft 3 in FIG. 2.

This shaft 3 has a fitting hole 3a in the center of the lower portion. The shaft 3 can be rotated by the spindle motor 6 through a bearing (not shown). This fitting hole 3a is formed to position/fix the shaft 3 to a shaft 6a of the spindle motor 6 without any eccentricity. A plurality of horizontal holes 3b extend through the shaft 3 from its side surface to the fitting hole 3a because the hole 3a is also used to inject a fluid such as air to correct the eccentricity of each medium 1. A porous material 5 serving as a fluid spouting hole member is forcibly fitted on the shaft 3. Since mediums 1 and spacers 2 are positioned with reference to the porous material 5, the porous material 5 is fixed to the shaft 3 without any eccentricity with respect to the fitting hole 3a in the lower portion of the shaft 3.

When a plurality of mediums 1 are to be stacked, the ring-like spacers 2 are inserted between the mediums 1 to ensure gaps between the respective mediums. The parallelism between the mediums 1 is maintained by the spacers 2, and the squareness with respect to a driving shaft 7 is determined by a collar 3C of the lower portion of the shaft 3. Owing to the tolerance of a diameter (opening portion) 1a of the hole in the central portion of the medium 1, there is no guarantee that the slight gaps between inner circumferential surfaces 1b of the mediums 1 and the porous material 5 have become uniform at this time. A damper 4 is fitted on the shaft 3 to restrict upward movement of the mediums 1 from the shaft 3 with the weight. In this state, a fluid such as air is injected into the shaft 3 through the inner holes 3a and 3b at a predetermined pressure. The injected fluid is discharged through the porous material 5 to form a fluid film in the gaps between the inner circumferential surfaces 1b of the mediums 1, the spacers 2, and the side surface portion of the shaft 3. With this operation, the inner circumferential surfaces of the mediums 1 are guided by the fluid to make the gaps between the mediums 1 and the shaft 3 uniform throughout the circumference. In addition, while the gaps are kept uniform, the mediums 1 and spacers 2 are fixed to the shaft 3 with screws or by pressing them with other members by using the clamper 4. The above operation makes it possible to stack/fix the respective mediums 1 while maintaining the parallelism of the mediums 1 and suppressing the eccentricity between the respective mediums 1 and the shaft 3.

Figure 3:
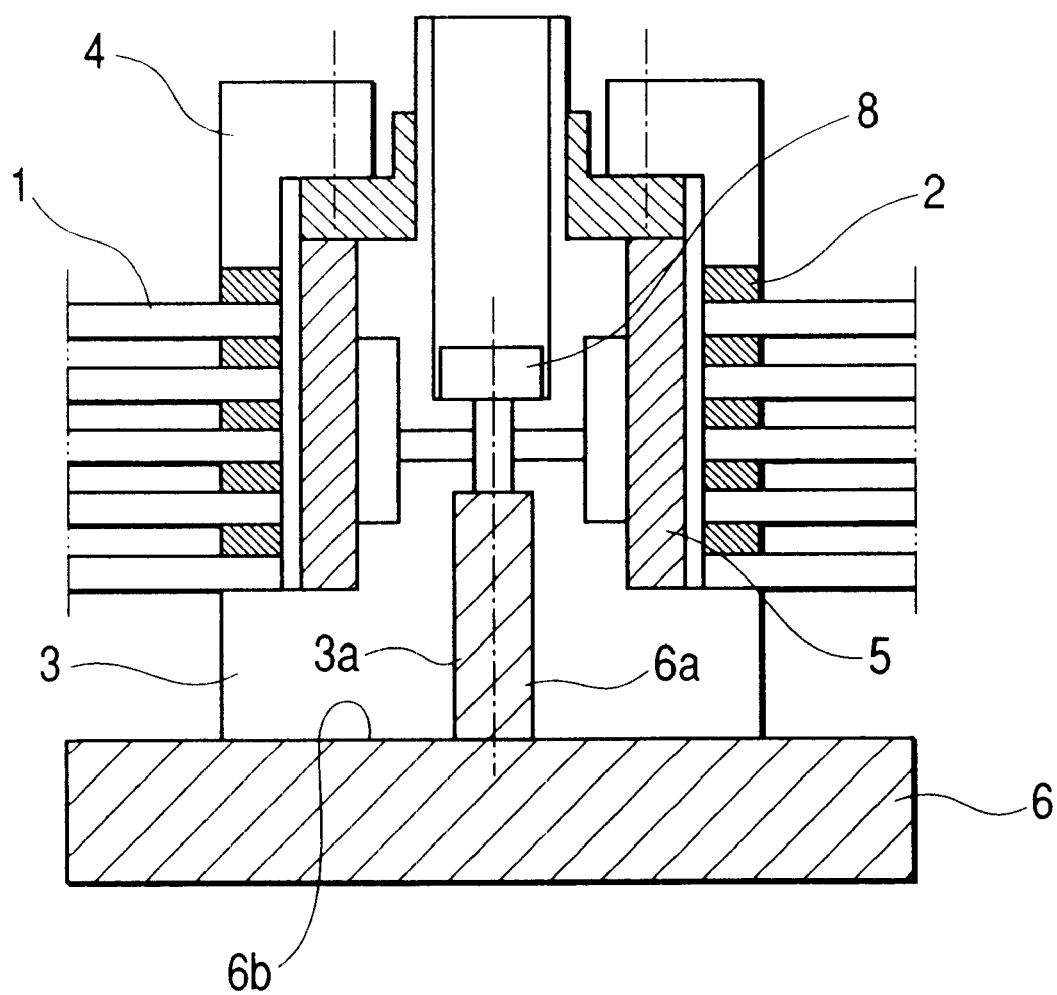
FIG. 3 is a sectional view showing the main part of a portion of the medium support apparatus according to the second embodiment of the present invention.

FIG. 3 shows a state wherein a plurality of magnetic disks 1 are actually stacked and fixed on the spindle motor 6 by using this medium support apparatus. Referring to FIG. 3, the medium support apparatus is positioned/fixed to the shaft 6a of the spindle motor 6 with the fitting hole 3a of the apparatus without any eccentricity. As a means (fixing means) for fixing the medium support apparatus to the spindle motor 6, a means for fixing the apparatus to the shaft 6a with screws or vacuum chucking by a spindle motor ground surface 6b is available.

Figure 4:
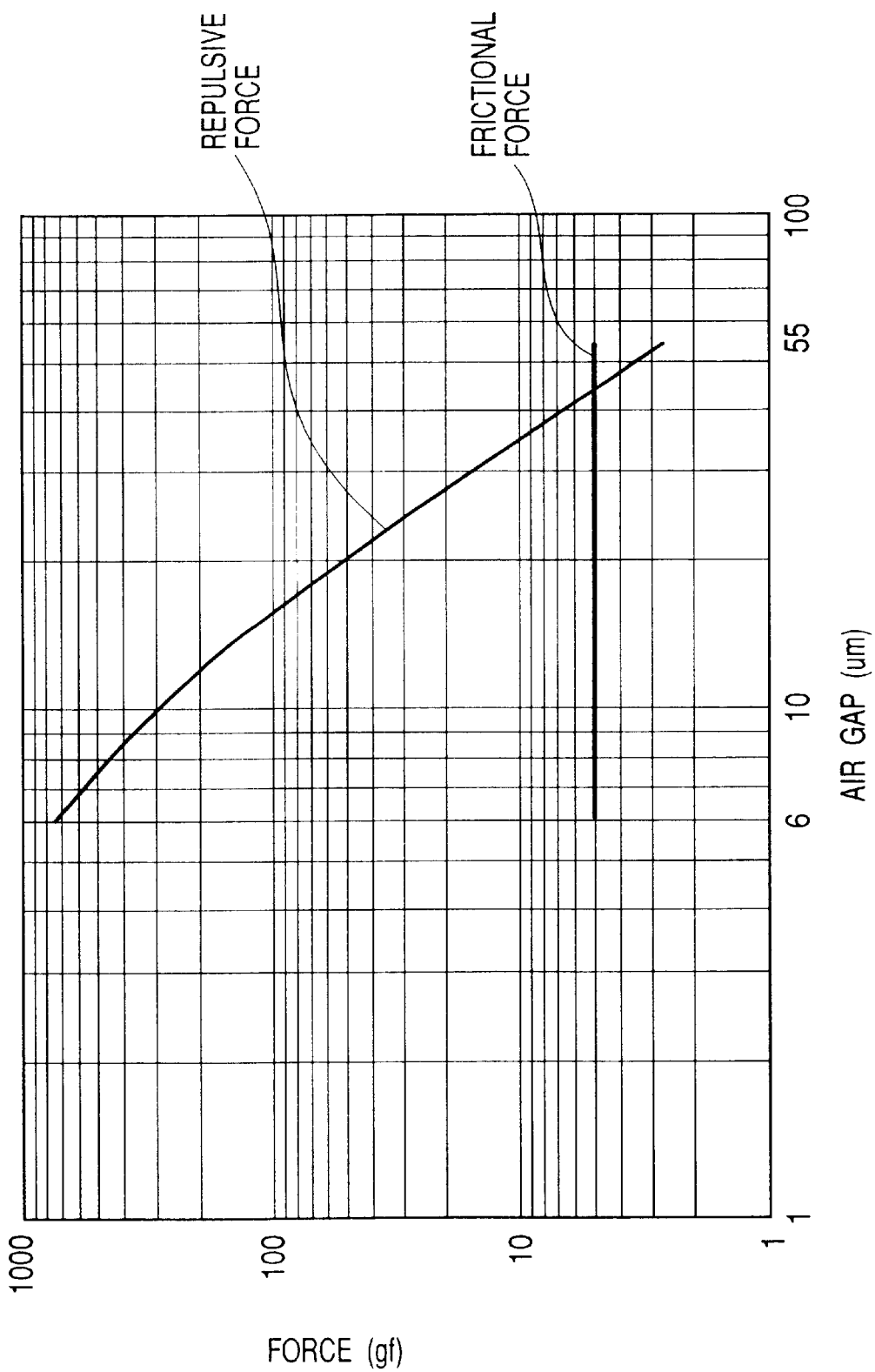
FIG. 4 is a graph showing the relationship between the gaps and the repulsive forces in the medium support apparatus according to the present invention.

As described above, in the medium support apparatus according to this embodiment, when a plurality of mediums 1 are to be stacked on the shaft, the porous material 5 is provided on the side surface portion of the shaft 3 to be inserted into the holes 1a in the central portions of the mediums 1. A fluid such as air is then injected into the holes 3a and 3b of the shaft 3, and the fluid is discharged through the porous material 5 to form a fluid film between the gaps between the holes 1a in the central portions of the mediums 1 and the shaft 3. The mediums 1 are then positioned while the gaps between the holes 1a in the central portions of the mediums and the shaft 3 are kept uniform, and the central holes are positioned without any eccentricity with reference to the shaft 3. When a plurality of mediums are to be stacked as well as one medium 1, the gaps between the spacers 2 and the shaft 3 are positioned and fixed in the same manner as described above, and dynamic weight balance is maintained with respect to the rotation of the overall medium support apparatus. FIG. 4 shows the relationship between the repulsive force of a fluid and the frictional force of a medium with respect to the distance from the porous material 5, which are obtained by calculation. This calculation is based on the assumption that the slight gap between the inner circumferential surface 1b of the medium 1 and the porous material 5 is 6 to 55 µm. Referring to FIG. 4, the repulsive force of the fluid is larger than the frictional force of the medium up to a gap of about 45 µm. If, therefore, the gap is equal to or smaller than this numerical value, the eccentricity of the medium can be theoretically adjusted.

Figure 5:
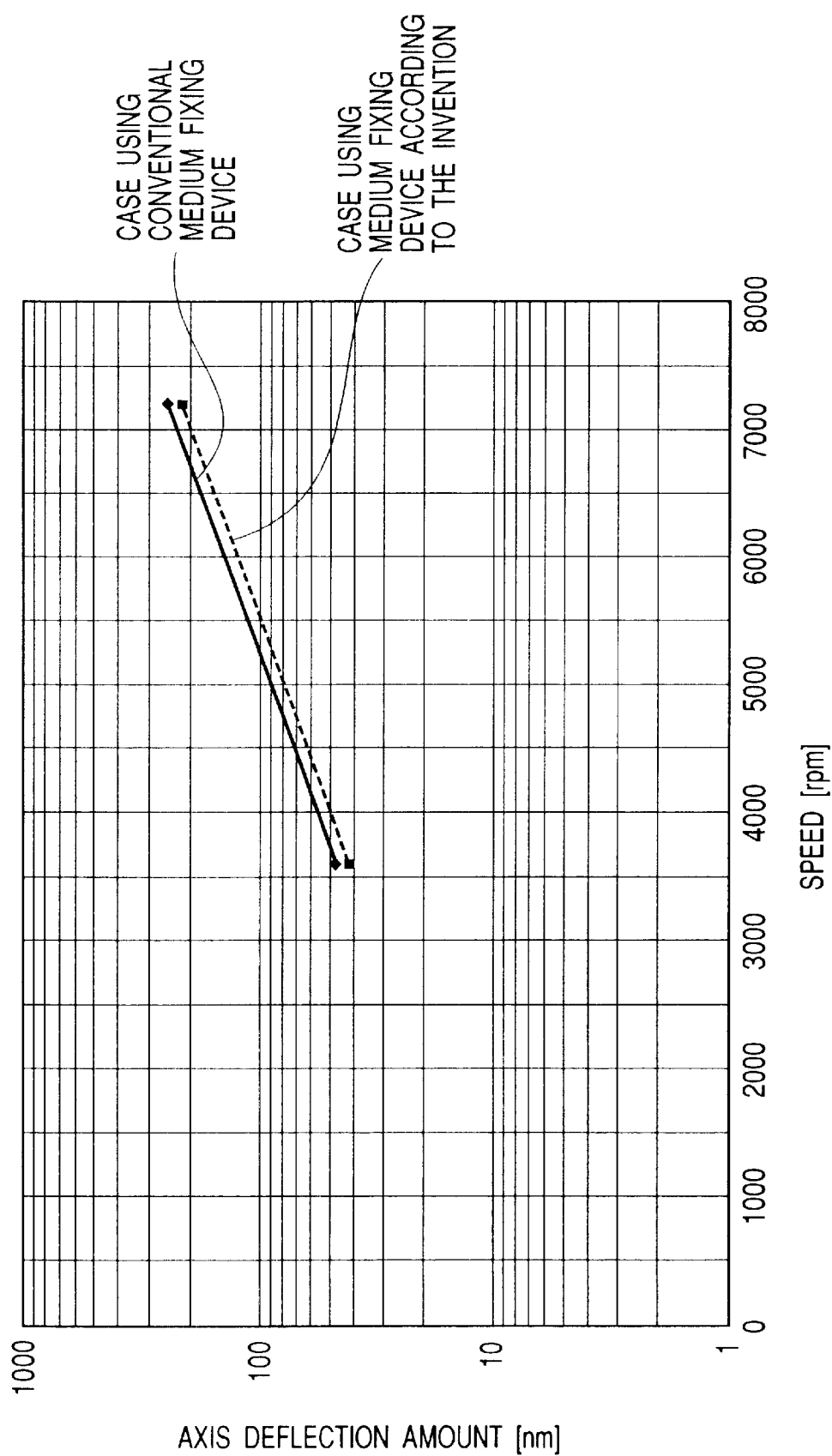
FIG. 5 is a graph for explaining the relationship between the weight balance and the axis deflection amount in the conventional medium support apparatus.
Figure 7:
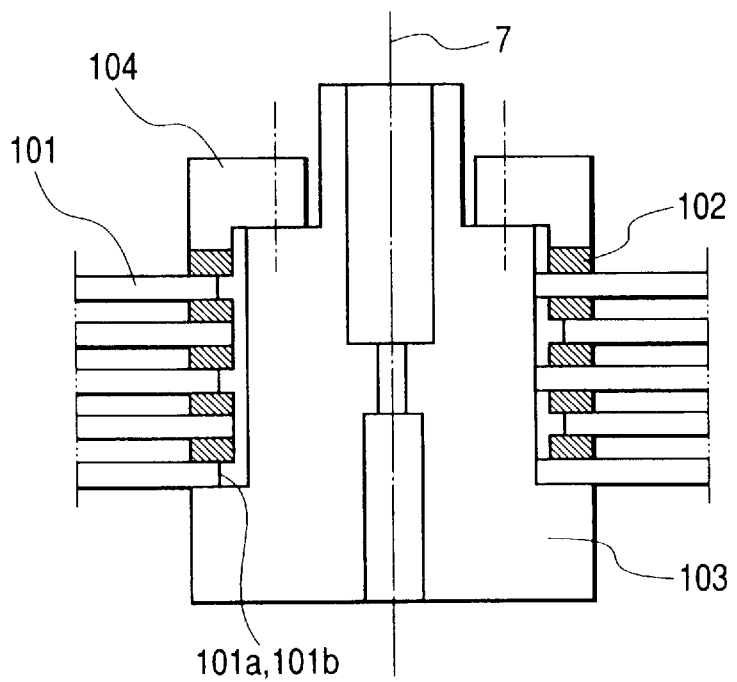
FIG. 7 is a sectional view showing the main part of a conventional medium support apparatus.

FIG. 5 shows the measurement results on axis deflection amounts in the medium support apparatus of the present invention, in which a plurality of magnetic disks are stacked on the shaft and rotated at various rotational speeds. For reference, similar measurement results in the conventional medium support apparatus shown in FIG. 7 are also shown. According to the present invention, the axis deflection amounts are much smaller than those in the prior art.

Figure 6:
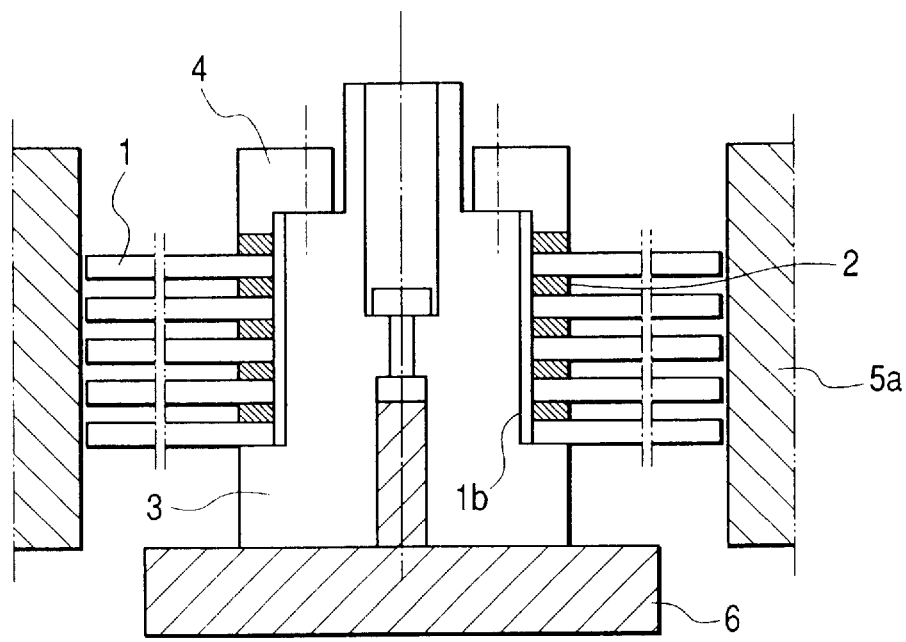
FIG. 6 is a sectional view showing the main part of a medium support apparatus according to the second embodiment of the present invention.

FIG. 6 is a sectional view of the main part of the second embodiment of the present invention. This embodiment differs from the first embodiment only in that one or a plurality of disk-like mediums 1 each having a circular hole 1a in a substantially central portion are stacked on, a shaft 3 is inserted into the opening portions of the mediums 1 to fix the mediums 1 on the shaft, a cylindrical porous guide (porous material) 5a having an opening portion with an inner diameter almost equal to the outer diameter of the mediums 1 is provided, and a fluid film is formed between the inner surface of the guide 5a and the outer circumferential surfaces of the mediums 1 by using a fluid such as air, thereby positioning the mediums 1 and guide 5a while making the gaps between the outer circumferential surfaces of the mediums 1 and the inner surface of the guide 5a uniform.

According to the present invention, there is provided a medium support apparatus which can reduce the axis deflection amounts of mediums such as magnetic disks with respect to a driving shaft when one or a plurality of mediums are positioned/fixed on a shaft, and can accurately rotate/drive the mediums at high speed.

What is claimed is:

1. A method for positioning one or a plurality of disk like media each having a circular opening portion in a substantially center thereof, onto a shaft, said method comprising the steps of:

inserting said shaft into the opening portions of said media;

disposing a guide element having a cylindrical porous material portion in a vicinity of outer circumferential surfaces of said media.

2. A support apparatus for supporting one or a plurality of disk like media each having a circular opening portion in a substantially center thereof, said apparatus comprising:

a shaft inserted into the opening portions of said media;

a guide element having a cylindrical porous material portion, which is disposed in a vicinity of outer circumferential surfaces of said media; and fluid film forming means for forming a fluid film between an inner circumferential surface of said porous portion and the outer circumferential surfaces of said media, wherein said disk like media is positioned with respect to a center axis of said shaft by said fluid film.

3. An apparatus according to claim 2, wherein the plurality of disk like media are stacked with ring-like spacers being inserted between the respective media.

4. An apparatus according to claim 2, further comprising fixing means for fixing the media to the shaft.

* * * * *